Sept. 15, 1953

E. J. H. BUSSARD

CONSTANT BAND WIDTH COUPLING CIRCUIT FOR TELEVISION RECEIVER TUNERS 2,652,487

Filed July 21, 1950

3 Sheets-Sheet 1

INVENTOR.
EMMERY J. H. BUSSARD
BY Alden D. Redfield
Charles M. Hogan
ATTORNEYS.

INVENTOR.
EMMERY J. H. BUSSARD
BY
Alden D. Redfield
Charles M. Hogan
ATTORNEYS

INVENTOR.
EMMERY J. H. BUSSARD
BY Alden D. Redfield
Charles M. Hogan
ATTORNEYS.

Patented Sept. 15, 1953

2,652,487

UNITED STATES PATENT OFFICE 2,652,487

CONSTANT BAND WIDTH COUPLING CIRCUIT FOR TELEVISION RECEIVER TUNERS

Emmery J. H. Bussard, Cincinnati, Ohio, assignor to Avco Manufacturing Corporation, Cincinnati, Ohio, a corporation of Delaware Application July 21, 1950, Serial No. 175,057

3 Claims. (Cl. 250—20)

The present invention relates to television receiver tuners. This application is a continuation in part of my U. S. Patent 2,579,789, issued December 25, 1951, entitled "Tuner for Television Receiver."

The primary objectives of this invention are to provide an improved constant band width coupling circuit. The tuner with which the invention is best utilized is of the continuous type—that is, it is continuously tunable by one manual operation through the lower standard television broadcast band extending from 54–88 megacycles, the frequency modulation broadcast band extending from 88–108 megacycles, and the upper television broadcast band which covers the range from 174–216 megacycles.

An object of the invention is to provide a tuner having between its radio frequency amplifier and frequency changing stages a tunable band pass selector network which manifests the following desirable characteristics: (1) The maintenance of a wide acceptance band adequate to translate the composite television signal inclusive of video and synchronizing signal and sound components during operation on each of the channels; (2) The preservation of adequately uniform gain characteristics throughout the two television bands inclusive of all of said channels.

For a better understanding of the present invention, together with other and further objects, capabilities and advantages thereof, reference is made to the following description of the accompanying drawings, in which there is shown a preferred illustrative tuner in accordance with the invention.

Figure 1:
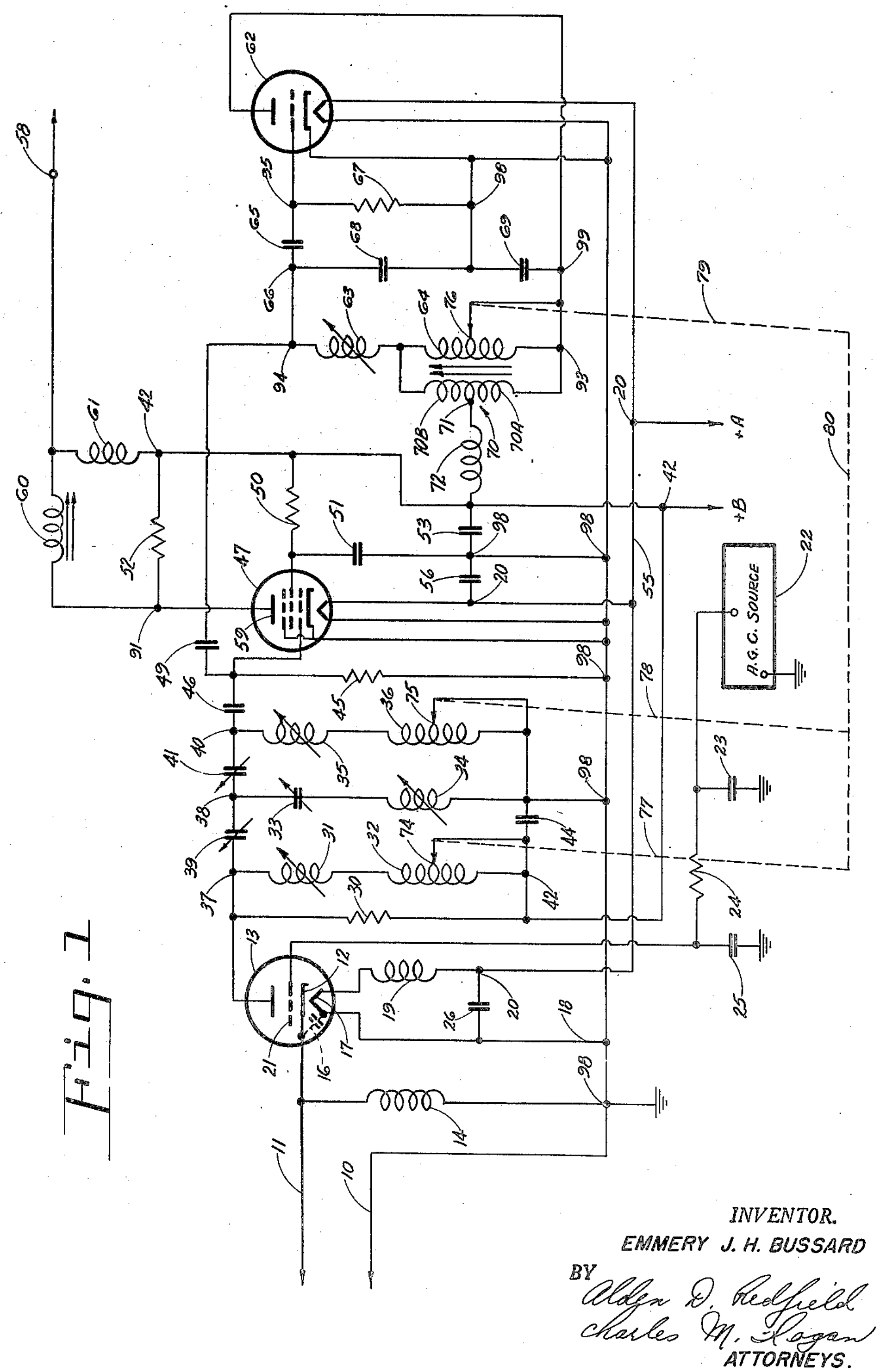
Fig. 1 is a circuit schematic of my improved tuner including a band pass selector circuit in accordance with the invention.

The tuner comprises the following principal stages: a radio-frequency amplifier or preselector stage and an oscillator-modulator or frequency-changer stage including a mixer tube and an oscillator tube coupled to the mixer tube to inject local oscillations therein, together with associated circuitry and mechanisms for intercoupling and uni-controlling the two stages.

The preselector or R. F. stage has a novel broadly fixed-tuned antenna input circuit described and claimed in my said U. S. Patent No. 2,579,789. In the specific example shown, this circuit (Fig. 1) is coupled to an unbalanced line such as a 75 ohm coaxial cable, the outer conductor 10 of which is grounded and the inner conductor 11 of which is connected to the cathode 12 of a radio frequency amplifier tube 13. The arrangement herein employed is referred to as a low impedance unbalanced cathode input. There is provided an inductor 14 between cathode and ground 98 (all grounded points having that reference numeral), this inductor having such a value that it resonates with the inherent cathode-heater capacity of the tube (dashed lines 16) at approximately the geometric mean of the range of television signal frequencies to be received. This range extends from 54 to 216 megacycles, so that the geometric mean is approximately 108 megacycles. This combination of lumped inductance 14 and inherent capacitance 16 provides a broadly tuned circuit which performs four significant functions: (1) It prevents the cathode-to-ground capacitance from unduly decreasing the input impedance of the stage and consequently the gain as the high frequency end of the range is approached, in that it provides an effective input impedance which is broadly peaked and relatively constant for all channels; (2) While a broad by-pass characteristic is provided, this circuit at the same time affords a workable match between the tube input and the antenna transmission line impedance; (3) The inductor 14 serves as a low pass filter or effective short circuit to ground for low frequency R. F. signals, such as those produced by nearby amplitude-modulation broadcast stations in the 550–1600 kilocycle band, and in fact for any undesired signals up to and including signals on the order of 25 megacycles—that is, signals on the order of the intermediate frequencies employed in standard television receivers; (4) The inductor 14 also serves as a direct current leakage path and prevents the accumulation of static charges on the antenna.

A suitable triode 13, such as a type 6AB4, is preferably used for this stage, one side of the heater 17 being grounded through lead 18. The other heater terminal is connected in series with a choke 19 and the ungrounded terminal 20 of the filament current source. A triode is preferred to a pentode, because of its lower tube noise level and lower interelectrode capacitance. The control electrode 21 is connected to an appropriate source of automatic gain control potential, indicated by the reference numeral 22. This source may be identical to that shown in U. S. Patent No. 2,559,038, Harland A. Bass, entitled "Automatic Gain Control Circuit for Television Receiver," applied for August 1, 1949, and assigned to the same assignee as the present patent. Interposed between the AGC source and the control electrode is a filter network comprising a shunt capacitor 23, a series resistor 24, and a second shunt capacitor 25, the last-mentioned capacitor also performing the function of R. F. grounding the grid 21 of the R. F. amplifier tube, whereby the advantages of a grounded grid amplifier tube are realized, to wit: the shielding action of the grid in suppressing oscillation-producing feedback, and the application of the R. F. signal to the cathode circuit, whereby a broad-band match is obtained. Disposed across the heater is a capacitor 26, provided for the purpose of preventing parasitics.

It will be observed that the radio frequency preselector stage is of the grounded grid amplifier type, the control electrode being grounded by capacitor 25 for R. F. signals. The grounded grid type of amplifier has a relatively low input impedance approximately equal to the reciprocal of the mutual conductance of the tube, which is essentially resistive. The input impedance of the type 6AB4 tube shown in this illustrative embodiment is approximately 160 ohms, the mutual conductance being in the region of 6250 micromhos. The tube input circuit is comprised of the parallel resonant circuit consisting of conductor 14 and capacitance 16, this parallel resonant circuit being shunted by the equivalent input resistance of the tube. At resonance the inductor branch 14 approximates 300 ohms in impedance, the capacitor branch 16 approximates 300 ohms in impedance, and the tube input branch approximates 160 ohms in impedance, these figures being based on the following assumed dimensions: choke 14, 0.44 microhenry; capacitance 16, 3.5 micromicrofarads (paralleled by the distributed capacitance of inductor 14, 1.4 micromicrofarads), the resistance or equivalent parameters in the capacitance branch being such that they can be neglected for purposes of this discussion. This resonant circuit shunted by the D. C. load varies narrowly in impedance between approximately 126 ohms and 160 ohms, so that a fairly constant match is provided for antenna input systems varying from 75 to 300 ohms.

The anode of tube 13 is shunt fed through a load network 30, 31, 32 connected to a source of space current indicated by the symbol +B. Several points at the same potential as the positive terminal of this source are assigned the reference numeral 42. The novel band pass selector circuit or constant band width coupling circuit for intercoupling the output of the radio frequency amplifier stage and the R. F. input of the mixer stage comprises two tuned circuits each of which includes common elements of an intercoupling network therebetween. One of these tuned circuits consists of inductance, comprising variable inductor 32 and adjustable inductor 31, arranged in series, and parallel capacitance comprised of the output capacitance of tube 13, the distributed capacitance of inductors 31, 32 and the effective capacitance of the coupling leg comprising elements 39, 33, 34 and 44. The other tuned circuit comprises inductance consisting of the series combination of variable inductor 36 and adjustable inductor 35, and parallel capacitance comprising the input capacitance of tube 47, the distributed capacitance of the elements 35, 36, and the effective capacitance of the coupling leg comprising elements 41, 33 and 34. For the purpose of intercoupling these two tuned circuits, there is provided an H-type coupling network, hereinbelow described in detail, comprising adjustable capacitor 39 connected between terminals 37 and 38, adjustable capacitor 41 connected between terminals 38 and 40, and the series combination of adjustable capacitor 33 and adjustable inductor 34 connected between terminal 38 and ground.

It will be understood that the tuning elements comprising inductor 32 and its contact 74, inductor 36 and its contact 75, and inductor 64 and its contact 76 are included in a three-gang spiral continuously variable ganged inductor. In this type of tuner a sliding contactor such as that indicated by the reference numeral 74, made of high silver content alloy possessing spring properties, rides on an inductor, such as that indicated by the reference numeral 32, made of silver wire. Contacts on the inductor provide circuit connections to both ends of the inductor. The sliding contactor "shorts" the unused portion of the inductance. Connected between terminal 38 of variable capacitor 33 and terminal 40 of the inductor 35 is an adjustable capacitor 41. In order to prevent short-circuiting of the +B terminal to ground there is interposed between a terminal of inductor 32 and the grounded terminal of inductor 34 a blocking capacitor 44. This selector circuit is effectively connected in parallel with the anode resistor 30 of tube 13 and the grid resistor 45 of tube 47, which resistors broaden the response curve somewhat. This adjustable coupling network provides a wide band tuning of the output circuit of the amplifier stage and the input circuit of the mixer stage and is adjustable through a wide range of frequencies.

A grid biasing network is provided in the input circuit of the mixer stage, which preferably comprises a pentode amplifier tube 47 such as the type 6AK5. This biasing network comprises a grid resistor 45 connected between control electrode and ground and a coupling capacitor 46 connected between the control electrode and terminal 40 of inductor 35. Local oscillations are injected into this input circuit by a connection from the oscillator stage through coupling capacitor 49. The suppressor grid is grounded as shown and the screen is provided with biasing potential by connection through a dropping resistor 50 to the positive terminal of the space current source, the screen being R. F. by-passed by a capacitor 51. The anode is connected to the space current source through inductors 60, 61, paralleled by a damping resistor 52, a by-pass capacitor 53 being connected between one lead of the load resistor 52 and ground, this by-pass condenser also functioning to complete the R. F. return to cathode for both legs of the oscillator tank circuit. The heater is connected between the positive heater supply line 55 and ground, as shown, a filament by-pass capacitor 56 being provided between the ungrounded filament lead and ground. The filament may be either A. C. or D. C. energized. The output terminals of this mixer stage are provided by ground and terminal 58. Interposed between the anode 59 and terminal 58 is a combination of a series adjustable iron core inductor 60 and a fixed shunt inductor 61.

Local oscillations are provided by a novel variable frequency oscillator manually tuned and tracked for an I. F. (intermediate frequency)

difference with the band pass selector network. This oscillator is disclosed and claimed in my said U. S. Patent No. 2,579,789 and my U. S. Patent No. 2,583,137. Preferably a triode 62 such as a type 6AB4 is employed. Inductance comprising an adjustable inductor 63 and a variable inductor 64 is arranged in series between the control electrode and the anode of tube 62, a blocking condenser 65 being interposed between terminal 94 of inductor 63 and the control electrode and a grid biasing resistor 67 being connected between said control electrode and the grounded cathode, as shown. The heater is connected between +A line 55 and ground. A series pair of capacitors 68 and 69 is effectively connected between the control electrode circuit and the anode, the central tap in the circuit between these capacitors being connected to the cathode as shown. There is provided in parallel with the variable inductor 64 another inductor 70 having a fixed tap 71 which is connected to the positive terminal of the space current source through an inductor 72. A D. C. path for anode current in tube 62 may be traced from the anode through one-half (70A) of inductor 70, the center tap 71 and inductor 72. An A. C. path may be traced from the anode of tube 62 to tap 71, through inductor 72 and capacitor 53 to ground. This novel circuitry causes the oscillator to be stabilized over a wide range of frequency of the local oscillations from 80 to 240 megacycles, the operation of the oscillator being described in detail in my said U. S. Patents No. 2,579,789 and No. 2,583,137. It will of course be understood that the sliding contacts 74 and 75 and 76 of inductors 32 and 36 and 64 are variably positioned in unison for manual tuning, they being ganged as by any suitable conventional expedients indicated by the dashed lines 77, 78, 79, and 80. These elements are included in the continuously tuned ganged inductor.

The tuner provided in accordance with this invention has very desirable noise characteristics. Over-all noise relative to thermal noise in a typical receiver incorporating a tuner in accordance with the invention is:

| Channel | Noise, db |
|---|---|
| 2 | 12.5 |
| 3 | 11.5 |
| 4 | 11.0 |
| 5 | 11.5 |
| 6 | 11.0 |
| 7 | 11.5 |
| 8 | 11.0 |
| 9 | 11.0 |
| 10 | 10.0 |
| 11 | 12.5 |
| 12 | 11.5 |
| 13 | 11.0 |

It has been determined that the gain and noise characteristics of this tuner are well above average performance, and the other characteristics such as selectivity, suppression of spurious responses, low oscillator radiation, sensitivity, stabilization, compact mechanical construction, and narrow frequency shift, compare very favorably with the best commercial tuners presently available on the market.

A typical tuner in accordance with the invention has the following voltage gain characteristic between the antenna and the input circuit of the first intermediate frequency stage (not shown), as determined in a typical case employing a 75 ohm dummy antenna input and a first intermediate frequency tube (not shown) with a 1000 ohm resistive plate load:

| Channel | Gain |
|---|---|
| 2 | 33.2 |
| 3 | 36.4 |
| 4 | 40.0 |
| 5 | 40.0 |
| 6 | 38.0 |
| 7 | 27.6 |
| 8 | 22.8 |
| 9 | 20.5 |
| 10 | 22.2 |
| 11 | 22.8 |
| 12 | 25.8 |
| 13 | 30.7 |

The requirements which are satisfied by the band pass selector network herein shown are very rigorous in that it must be tunable through a range from 54 to 216 megacycles while maintaining an acceptance band having a width of 4 to 6 megacycles or more and while manifesting substantial uniformity of gain at the extremes of the bands. In the specific illustrative selector network shown, the band width has been found to approach but not to exceed 4 megacycles when the tuner is attuned to channels 2 (54–60 megacycles) and 13 (210–216 megacycles), and the band width equals 6 megacycles at channels 6 or 7 (82–88, 174–180 megacycles). A double hump band pass characteristic is provided by the two coupled tuned circuits the equivalents of which are marked A and B in Fig. 3.

Figure 2:
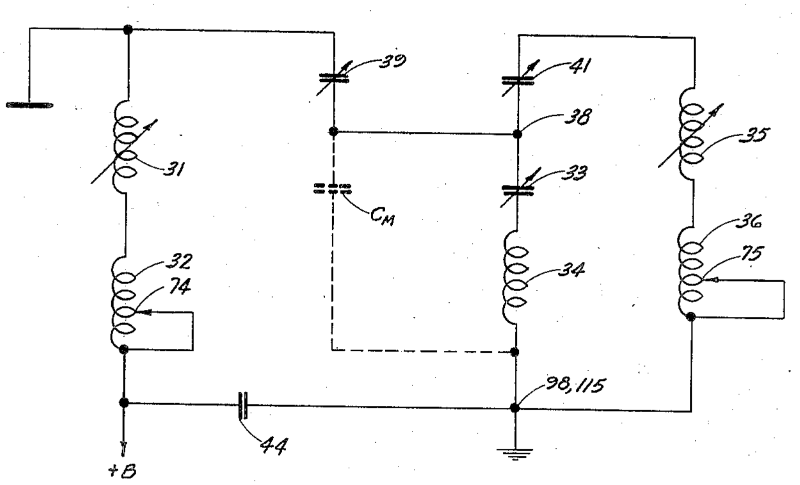
Fig. 2 is a circuit diagram of the band pass selector network provided in the tuner in accordance with the present invention.
Figure 3:
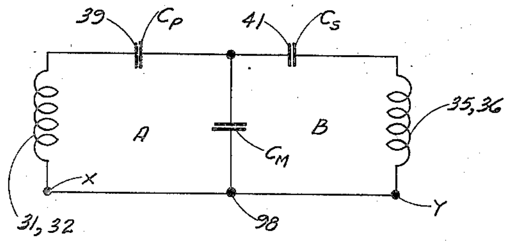
Fig. 3 is a circuit equivalent of Fig. 2.
Figure 4:
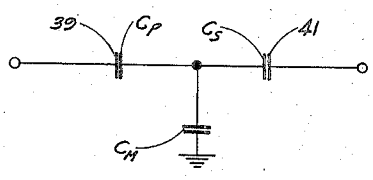
Fig. 4 is a diagram of a T-type capacitive coupling circuit employed as an aid in describing the Fig. 2 band pass selector network.

The Fig. 3 diagram will be understood to be roughly an equivalent for all elements of the selector network illustrated in Figs. 1 and 2 excepting 33, 34. The Fig. 2 network includes the following components: 31, 32, 44, 39, 33, 34, 41, 35, 36. The Fig. 3 network is simplified for purposes of explanation of operation. In accordance with the invention, the coupling between the primary and secondary circuits is effected not only by the fixed mutual capacitance marked $C_M$ in Fig. 2, but also by reason of the provision of the leg comprising capacitor 33 and inductor 34. The inductors 31 and 35 are not magnetically or inductively coupled together and are spaced apart and positioned at right angles in order to prevent such coupling. The leg 33, 34 is designed to be resonant at a frequency above the band of frequencies to be received, and this leg therefore acts effectively as an additional capacitive coupling element in parallel with $C_M$ throughout the tuning range of the band pass selector network. Detailed explanation of this feature is postponed for the moment pending consideration of the usual T-type capacitive coupling. The circuit shown in Fig. 4 is well known to those skilled in the art. Let it be supposed for purposes of discussion that each of $C_P$ and $C_S$ is associated with a proper inductance, so that two tuned coupled circuits are formed. When the supposititious primary and secondary are over-coupled and both tuned to the same frequency, the secondary current characteristic has two humps when the coupling is large, and therefore this well-known type of circuit has a desirable band pass characteristic. However, when double tuned circuits employing over-coupling (beyond critical) are tuned (Fig. 4) through a wide range, as by variation of inductance parameters therein, the acceptance band is widened as the resonant frequencies are increased, since the coefficient of coupling is purely a function of $C_M$ and the primary and secondary capacitance parameters and remains constant.

An object of the invention is to prevent the pass band from being unduly wide at the high end of the tuning range, while at the same time insuring that the acceptance band is sufficiently wide at the low end of the tuning range to prevent excessive side band cutting. In accordance with the invention, substantial constancy of the pass band is effected throughout the range by providing the series combination of capacitor 33 and inductor 34 in shunt with the capacitance $C_M$. As hereinbefore indicated, the circuit 33, 34 is resonant at a frequency above the tuning range and therefore the impedance of the circuit 33, 34 drops off as the tuner is adjusted from a lower frequency channel to a higher frequency channel. It will be seen that at resonance the circuit 33, 34 would effectively be a short circuit across the capacitance $C_M$, and the coupling between the primary and the secondary circuits would be reduced to an extremely low value. The coupling between the primary and secondary circuits is a function of the value of their common impedance. The common impedance comprising $C_M$ and the circuit elements 33 and 34 falls off at a much more rapid rate with increase in frequency, than would the impedance of $C_M$ alone. The combination of $C_M$ and the leg comprising capacitor 33 and inductor 34 is equivalent to a capacitive coupling parameter which decreases in value at a proper rate with an increase in frequency. Proper functioning of this circuit requires that there be no substantial magnetic or inductive coupling between the inductors 31 and 35. Particular attention is directed to this feature because it, and other significant features, distinguish my novel constant band width coupling circuit from the type of circuit illustrated in such patents as U. S. Patent No. 2,511,185 to Paul Ware. It is significant to observe that circuits of that type require that the end inductors be of a predetermined fixed value and that they maintain a fixed mutual inductive relationship both as to value and phase. On the other hand, in my novel circuit the inductors 31 and 35 are made adjustable to permit proper alignment of the inductive branches. I prefer the following alignment procedure:

(*a*) At channel 4—
- (1) The oscillator is adjusted to a frequency of 93.65 megacycles;
- (2) Capacitor 33 is shorted out or made abnormally large so that it presents a negligible common impedance to the two coupled circuits;
- (3) The capacitors 39 and 41 are adjusted for a peak output at 67.25 megacycles;
- (4) The short circuit is removed from capacitor 33, and capacitor 33 is adjusted for the proper coupling to provide peak spacing of the pass band of 4.5 megacycles—that is, 67.25 and 71.75 megacycles.

(*b*) At channel 11—
- (1) The oscillator is adjusted to a frequency of 225.65 megacycles;
- (2) With input signals of 199.25 megacycles and 203.75 megacycles, inductors 31 and 35 are adjusted for maximum gain;
- (3) Inductor 34 is adjusted for proper peak spacing of 4.5 megacycles.

This alignment procedure, which has been found to be commercially successful, is enhanced by the prevention of inductive coupling between inductors 31 and 35.

Another advantage of my novel circuit resides in the fact that the circuit capacity is maintained essentially at the minimum limit, so that maximum gain is realized. This circuit provides the correct static coupling for the lowest operating frequency. This coupling is effectively reduced with increasing frequency by the series resonant circuit comprising the elements 33 and 34, this series circuit being adjusted for the correct coupling in the high range.

My novel circuit does not suffer from the serious disadvantage which manifests itself where fixed inductors corresponding broadly to the elements 31 and 35 are magnetically coupled. Such magnetically coupled fixed inductors provide a relatively tightly coupled path for passing local oscillator voltages toward the antenna, especially where the oscillator is operating on the high side of the signal frequency. It has been indicated above that the oscillator works at a higher frequency than the input signal frequency. Since the elements 33 and 34 tend to decrease the coupling with increasing frequency, they couple input signals from the R. F. stage to the mixer considerably more effectively than they couple oscillator voltage from the mixer back to the antenna, and in fact these two elements furnish substantial discrimination against oscillator voltages, which discrimination becomes more effective as the tuner is adjusted for the higher frequencies. On the other hand, in the type of circuit involving magnetically coupled fixed inductors, the acceptance of oscillator voltages passing from the mixer circuit to the input circuit and antenna increases with increasing frequency.

Still another advantage accrues in that the circuit parameters of my improved tuner are physically located for convenience of assembly and maximized for gain and selectivity, the coupling parameters being effectively a frequency-sensitive automatically adjusted capacitor.

Since the parameters $C_M$, 33, 34 behave in the manner described, they effectively decrease the coefficient of coupling between primary and secondary circuits as the tuner is adjusted from the lower frequency channels to the higher frequency channels. The decrease in the coefficient of coupling is so established that the pass band of the tuner is maintained relatively constant between approximately 4.5 megacycles and 6 megacycles, being of maximum width at channels 6 and 7 and of minimum width at channels 2 and 13. Conversely, when the frequency to which the tuner is adjusted decreases, the common impedance comprising $C_M$ and the leg 33, 34 tightens the coupling between the primary and secondary circuits and tends to broaden the pass band. In this manner the band pass selector provided in accordance with the invention successfully maintains an acceptance band which is satisfactorily uniform for commercial purposes.

While I have shown my novel band pass selector network as an intercoupling network between a radio frequency amplifier stage and a frequency changing stage, it will be understood that it is of equal utility in cascade radio frequency stages.

Figure 5:
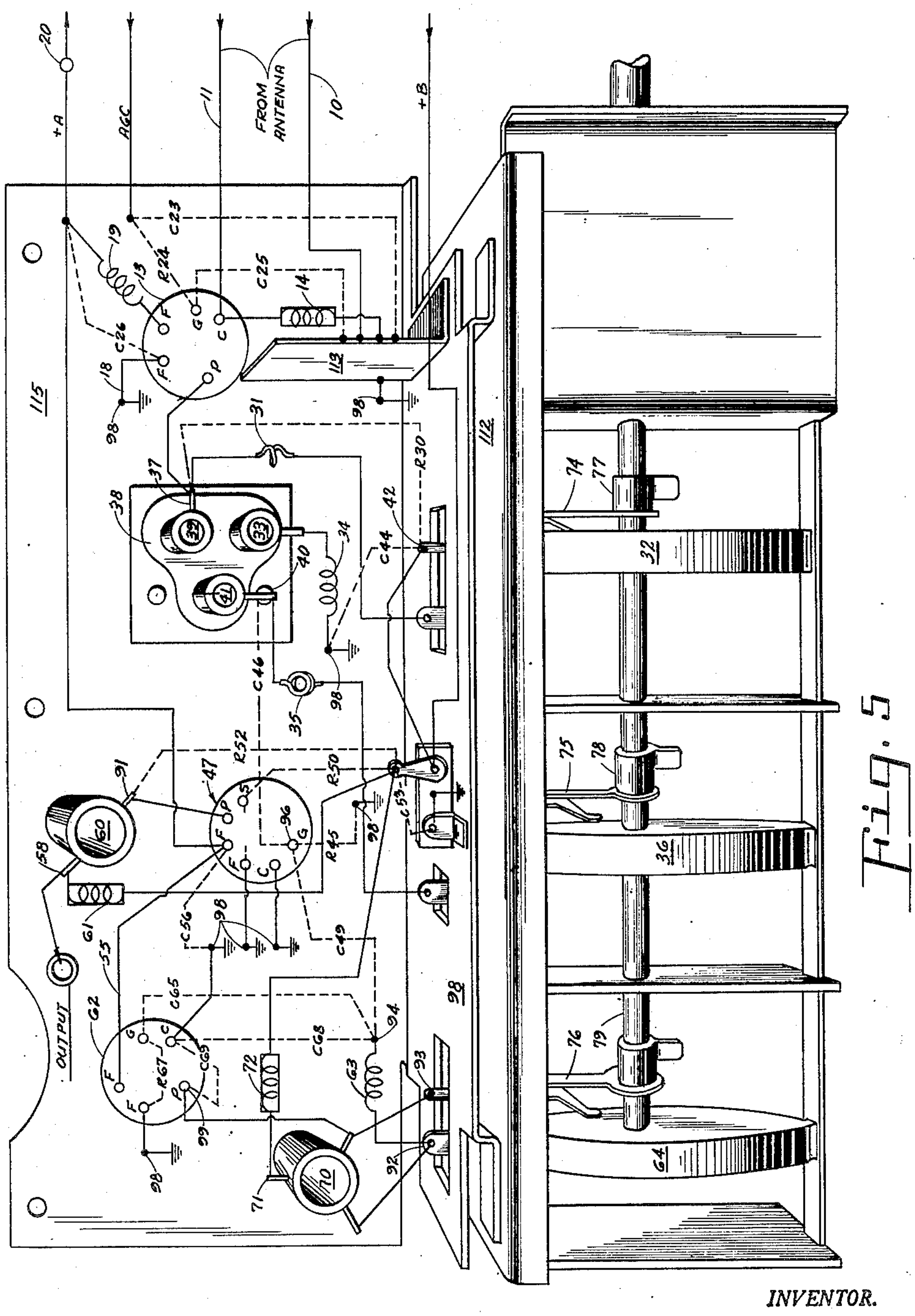
Fig. 5 is a rear perspective view of the tuner assembly including the circuitry provided in accordance with the invention.

In this circuit, $C_M$ is the capacity between a coupling plate 38 (to which one plate of each of capacitors 39, 41, 33 is connected) and the grounded metallic support 115, as shown in Fig. 5.

While I do not desire to be limited to one specific set of circuit parameters, the latter varying in accordance with particular design requirements, the following have been found to be satisfactory in one successful embodiment of the present invention.

| Element | Value or Type |
|---|---|
| 13 | Tube type 6AB4. |
| 47 | Tube type 6AK5. |
| 62 | Tube type 6AB4. |
| Capacitor 26 | 470 micromicrofarads. |
| Capacitor 44 | 1,000 micromicrofarads. |
| Capacitor 46 | 15 micromicrofarads. |
| Capacitor 49 | 1 micromicrofarad. |
| Capacitor 51 | 470 micromicrofarads. |
| Capacitor 56 | Do. |
| Capacitor 53 | 1,000 micromicrofarads. |
| Capacitor 65 | 5 micromicrofarads. |
| Capacitor 68 | 6 micromicrofarads. |
| Capacitor 69 | 4 micromicrofarads. |
| Capacitor 25 | 5,000 micromicrofarads. |
| Capacitor 23 | 1,000 micromicrofarads. |
| Capacitor 39 | 1.5–8 micromicrofarads. |
| Capacitor 41 | Do. |
| Capacitor 33 | 1.5–12.5 micromicrofarads. |
| $C_M$ | 6.5–7 micromicrofarads. |
| Cathode-heater capacitance of tube 13. | 3.5 micromicrofarads. |
| Resistor 24 | 220,000 ohms. |
| Resistor 30 | 3,900 ohms. |
| Resistor 45 | 1 megohm. |
| Distributed capacitance of inductor 14. | 1.4 micromicrofarads. |
| Resistor 50 | 150,000 ohms. |
| Resistor 52 | 10,000 ohms. |
| Resistor 67 | 12,000 ohms. |
| Inductor 14 | 0.44 microhenry. |
| Adjustable inductor 31 | 0.018–0.03 microhenry, normally. |
| Adjustable inductor 35 | 0.02–0.035 microhenry, normally. |
| Variable inductor 32 | 0.025–0.692 microhenry. |
| Variable inductor 64 | Do. |
| Variable inductor 36 | Do. |
| Inductor 19 | 0.6 microhenry. |
| Adjustable inductor 63 | 0.03–0.04 microhenry. |
| Adjustable inductor 34 | 0.035–0.045 microhenry. |
| Iron core variable inductor 70 | 0.04 microhenry, each section, without core; 0.125 microhenry, whole coil with iron in place. |
| Inductor 72 | 1.1 microhenries. |
| Plate supply voltage, $K+$ | 120–150 volts. |

Thus it will be seen that the invention embraces a band pass selector network tunable throughout the standard television broadcast band for intercoupling the anode circuit of the radio frequency amplifier tube 13 and the control electrode circuit of the frequency changing tube 47 of a television receiver while maintaining a broad acceptance band sufficiently wide to pass the video and synchronizing signal components, comprising two branches, each of said branches consisting of the combination of an adjustable inductor and a variable inductor cumulatively connected, one of said combinations 31, 32 resonating with the inherent capacitance provided by said anode circuit and the other of said combinations 35, 36 resonating with the inherent capacitance provided by said control electrode circuit to provide double tuned band-pass selection, means 74, 75, 77, 78, 80 for tuning each of said variable inductors in unison by short-circuiting portions thereof, means 44 and wiring for R. F. connecting one terminal of each of said variable inductors to a low potential terminal 98, and an H-type capacitive coupling circuit between said branches comprising a pair of capacitors 39, 41 connected in series between the remaining terminals of said adjustable inductors, a series combination of a third capacitor 33 and a fifth inductor 34 connected between the junction of said pair and said low potential terminal as a series resonant circuit tuned above the band of received signal frequencies to constitute a capacitive coupling element thereby to decrease the coupling between the two resonant branch circuits as said selector network is tuned to pass higher frequency bands, thus tending to maintain an acceptance band of uniform width throughout all television channels, and a fourth capacitive coupling parameter, in shunt with said series resonant circuit, comprising the inherent capacitance between said low potential terminal (chassis 98) and interconnected terminals (plate 38) of the first three capacitors.

As indicated above, I prefer to process the tuner at the factory by employing capacitors 39, 41, and 33 of the band pass selector network for alignment at channel 4. These capacitors are sometimes roughly referred to as trimmer capacitors. At channel 11 I prefer to align with the adjustable inductors 31, 34 and 35, so far as the band pass selector network is concerned. Referring now to the oscillator, I align with the iron core inductor 70 at channel 4 and with the adjustable inductor 63 at channel 13. The inductors 31, 35, and 63 are herein referred to as "end" inductors.

A novel oscillator is provided in this tuner and described and claimed in my aforementioned U. S. Patents No. 2,579,789 and No. 2,583,137. This oscillator is illustrated in Fig. 1, and although at first glance it may appear to have some points of similarity to the well-known Colpitts type oscillator, it will readily be seen from a careful examination of the circuit that it substantially departs from such type of oscillator. This novel oscillator has a tuned plate tank circuit, a tuned grid tank circuit, and a common cathode impedance in both circuits.

It will be seen that this novel oscillator has a grid tank circuit comprising inductor 70B, inductor 63, capacitor 68, and inductor 72. This oscillator also has a plate tank circuit comprising inductor 70A, capacitor 69 and inductor 72, the last-mentioned inductor being in the cathode circuit and common to both tank circuits, so that the portion of the voltage fed back from the plate circuit to the grid circuit is applied to the grid circuit through this common inductance 72. In the well-known conventional tuned grid, tuned plate type of oscillator, such as that shown at page 392, Figs. 10–55, Reich, Theory and Applications of Electron Tubes, second edition, McGraw-Hill Book Company, Inc., New York, the grid-plate capacitance $C_{GP}$ provides the feedback path. My novel oscillator differs from this type of circuit in the respect, among others, that feedback voltage is applied to the grid circuit by the common inductor 72.

It should be noted that the capacitors 69 and 68 also function as a voltage divider network between input and output circuits, the voltages for their respective terminals remote from one another being approximately 180 degrees out of phase, so that feedback will result.

Tuning of the oscillator is effected by variation of inductor 64, the latter being connected between the junction of inductor 70A and capacitor 69 and the junction of inductors 70B and 63. Inductor 63 is magnetically isolated from inductor 70B as shown in Fig. 5, and there is essentially no mutual coupling therebetween.

The operating frequency of the oscillator is the frequency to which the LC circuit comprising capacitors 69 and 68 (and the effective capacitance in shunt therewith) and inductors 64 and 63 (and the inductance effectively in shunt therewith) is tuned. If it be assumed that this frequency is, say, 200 megacycles, then each of the grid and plate tank circuits, considered alone, is so tuned below the operating frequency as to appear capacitive at that frequency. In fact, each of these tank circuits, considered alone, appears to be capacitive at each operating frequency.

The grid-anode capacitance parameters furnish additional coupling between the grid and plate tank circuits. However, the principal coupling is that afforded by the common magnetic element or inductor in the cathode circuit. As indicated in Fig. 1, the oscillator is adjusted as to frequency by manual variation of inductor 64, that variable inductor being ganged with inductors 36 and 32.

In the description of the preferred mechanical assembly in accordance with the invention, the positions of the following elements are shown in detail: Tube 13, tube 47, tube 62, capacitors 39, 41, and 33, inductors 31, 32, 34, 35, 36, 60, 61, 63, 64, 14, 19, 72 and 70. The other circuit elements are simply suggested by dashed lines; for example, the dashed line having the symbol C68 at the mid-point thereof in Fig. 5 and connected between point 94 and the grounded cathode of tube 62 has reference to the capacitor 68, Fig. 1, which is effectively connected in Fig. 1 between point 94 and point 98. Similarly, the dashed line between points 94 and 96 in Fig. 5 indicates the capacitor 49 which is employed for purposes of oscillation injection, point 96 being effectively the mixer tube grid and point 94 being the junction of capacitor 49, inductor 63 and capacitor 65. It is well known to those skilled in the art that capacitors and resistors are simply suspended between convenient points and soldered onto leads or terminals, and therefore the circuit elements indicated by the dashed lines are not shown in detail in Fig. 5, various modes of positioning such elements being well known to those skilled in the art. It should be particularly observed that end inductor 31, end inductor 63 and end inductor 35 are shielded, to the fullest extent practicable, by metallic support 112 from the main inductor tuning coils 32, 64, and 36 respectively. It will also be observed that the inductor 31 is shielded by the vertically extending divider 113 from the R. F. input stage element 14. Inductors 31 and 35 are spaced and axially oriented at right angles to each other to prevent magnetic coupling therebetween. They can be shielded from each other, if desired. The present invention differs from the prior art in the respect, among others, that magnetic coupling between coils 31 and 32 and between coils 35 and 36 is prevented to the fullest extent possible. Elements 31, 32 inductively add. So also, coils 35, 36.

It will be noted that the mounting assembly comprises a main base member 98 extending in a generally horizontal direction, and an integral vertical support member 115. The envelopes of the tubes 13, 47 and 62 project to the rear of this dividing member, and the mounting screws for the capacitors 33, 39 and 41 are brought out to the rear. Secured to the main base member 98 is another dividing member 113 which is transverse to both members 115 and 98. The base member 98 is secured to the metallic top 112 of the ganged inductor unit as best shown in Fig. 5. It will be understood that the elements 98, 113, 115 and 112 are at the same D. C. potential, that 98 is the main base or ground member, and that the elements 113, 115, and 112 are of primary utility as shields. The parameter $C_M$ (Fig. 2) has been hereinabove discussed in some detail. It is in effect the capacitance between the metallic coupling plate 38 and the metallic divider 115, as will be apparent from an inspection of Fig. 5. $C_M$ is effectively provided by the inherent capacitance between the low potential terminal 98 of the band pass selector network and the interconnected plates of capacitors 41, 39 and 33. It will be understood that this capacitance $C_M$ is in effect increased by the provision of the coupling plate 38 and elements at the same potential being connected to point 38 (Fig. 1). The coupling plate 38 is spaced from the vertically extending divider 115 as by a dielectric strip. This construction is also shown in detail in my said U. S. patent No. 2,579,789.

In the foregoing description I have used such reference numerals as 98 and 42 to indicate points which are at the same D. C. potential. I have also used simplified figures such as that shown in Fig. 4 for purposes of clarity in description of operation. Fig. 4 is representative of T-type coupling, while H-type coupling is actually employed in the band pass selector network illustrated in Fig. 2. In H-type coupling the cross arm of the H, which extends horizontally in ordinary capital lettering, extends vertically as shown in Fig. 3, and the two legs of the H extend horizontally, the upper leg being shown in Fig. 3 as $C_P$ and $C_S$. The lower leg consists of the distributed impedance between point X and grounded point 98 and point Y and grounded point 98 shown in Fig. 3.

While there has been shown and described what is at present considered to be the preferred embodiment of the present invention, it will be obvious to those skilled in the art that various modifications and substitutions of equivalents may be made therein without departing from the true spirit of the invention and the scope of the claims appended hereto.

It will be understood that various subordinate features and accessories may be added to the tuner. For example, in Fig. 5, the support 115 may serve as the front or back of a box-like metallic enclosure for further shielding all of the components and for preventing oscillator radiation and spurious pickup, such shielding being well known to those skilled in the art.

I claim:

1. A band pass selector network tunable throughout the standard television broadcast band for inter-coupling the anode circuit of a radio frequency amplifier tube having an anode and cathode and the control electrode circuit of a frequency-changing tube having a control electrode and cathode while maintaining a broad acceptance band sufficiently wide to pass the video and synchronizing signal components comprising two magnetically isolated branches, each of said branches consisting of the combination of an adjustable inductor and a variable inductor cumulatively connected, one of said combinations resonating with the inherent capacitance provided by said anode circuit and the other of said combinations resonating with the inherent capacitance provided by said control electrode circuit to provide double tuned band-pass selection, means for tuning each of said variable inductors in unison by short-circuiting portions thereof, means for radio-frequency connecting one terminal of each of said variable inductors to a low potential terminal connected to said cathodes, and an H-type capacitance coupling circuit between said branches comprising a pair of capacitors connected in series between the remaining terminals of said adjustable inductors and in series relation to the anode of the amplifier tube and the control electrode of the frequency-changing tube, a series combination of a third capacitor and a fifth inductor connected between the junction of said pair of capacitors and said low potential terminal as a series resonant circuit tuned above the band of received signal frequencies to constitute a capacitive coupling element thereby to decrease the coupling between the two resonant branch circuits as said selector network is tuned to pass higher frequency bands, thus tending to maintain an acceptance band of uniform width throughout all television channels, said third capacitor having a terminal directly connected to said junction, a coupling plate connected to said three capacitors, and a fourth capacitive coupling parameter, in shunt with said series resonant circuit, comprising the capacitance between said low potential terminal and the coupling plate so interconnecting plates of the first three capacitors.

2. A band pass selector network tunable throughout the standard television broadcast band for intercoupling the anode circuit of a radio frequency amplifier tube having an anode and cathode and the control electrode circuit of a frequency-changing tube having a control electrode and cathode while maintaining a broad acceptance band sufficiently wide to pass the video and synchronizing signal components comprising two inductance branches magnetically isolated from each other, one of said branches resonating with the inherent capacitance provided by said anode circuit and the other of said branches resonating with the inherent capacitance provided by said control electrode circuit to provide double tuned band-pass selection, means for tuning each of said inductances in unison by short-circuiting portions thereof, means for radio-frequency connecting one terminal of each of said branches to a low potential terminal connected to said cathodes, and a coupling circuit between said branches comprising a pair of capacitors connected in series between the remaining terminals of said inductances and in series relation to the anode of the amplifier tube and the control electrode of the frequency-changing tube, a series combination of a third capacitor and an inductor connected between the junction of said pair of capacitors and said low potential terminal as a series resonant circuit tuned above the band of received signal frequencies to constitute a capacitive coupling element thereby to decrease the coupling between the two resonant branch circuits as said selector network is tuned to pass higher frequency bands, thus tending to maintain an acceptance band of uniform width throughout all television channels, said third capacitor having a terminal directly connected to said junction, and a fourth capacitive coupling parameter, in shunt with said series resonant circuit, comprising the capacitance between a chassis at the same potential as said low potential terminal and a coupling plate spaced from said chassis and at the same potential as interconnected plates of the first three capacitors, and a connection between the last-mentioned coupling plate and said interconnected plates.

3. A television receiver tuner comprising:

First, a radio frequency amplifying stage comprising an amplifier tube having a cathode-control electrode input circuit and an anode-cathode output circuit and means for applying carrier frequency signals to said stage;

Second, a frequency-changing stage comprising an electron tube having at least cathode, control, and anode electrodes;

Third, a pass band selector network tunable throughout the standard television broadcast band for intercoupling the anode circuit of the radio amplifier tube and the control electrode circuit of the frequency-changing tube while maintaining a broad acceptance band sufficiently wide to pass the video and the synchronizing signal components, comprising two branches, each of said branches consisting of the combination of an adjustable inductor and a variable inductor cumulatively connected, one of said combinations being connected in series with the anode of said amplifier tube and resonating with its own distributed capacitance and the inherent anode-cathode capacitance of said amplifier tube and the other of said combinations being coupled between the cathode and control electrodes of said frequency-changing tube and resonating with its own distributed capacitance and the inherent cathode-control electrode capacitance of said frequency-changing tube to provide double-tuned band pass selection, means for radio-frequency connecting one terminal of each of said variable inductors to a grounded terminal, and a uniform acceptance band coupling network between said branches comprising a pair of capacitors connected in series between the high potential terminals of said adjustable inductors and in series relation to the anode of the amplifier tube and the control electrode of the frequency-changing tube, an inductance-capacitance leg series resonant above the television broadcast bands and connected between the junction of said capacitors and ground, the capacitance portion of said leg being connected directly to said junction, and a third capacitor in parallel with said leg and comprising a coupling plate spaced from ground, said coupling plate being interconnected to one plate of each of the other capacitances in the network;

Fourth, an oscillator for applying locally generated oscillations to said frequency-changing tube comprising an electron tube having a tank circuit including a variable inductor;

Fifth, means for applying oscillations from said oscillator to the control electrode of said frequency changing tube;

Sixth, metallic mounting means for shielding all of said variable inductors from each other and from the adjustable inductors of said selector network, while supporting all of the other elements of said tuner and providing a common ground;

Seventh, means for magnetically isolating each adjustable inductor from the other; and Eighth, continuously operable unicontrol means on the mounting means for variably short-circuiting all of said variable inductors.

EMMERY J. H. BUSSARD.

References Cited in the file of this patent

UNITED STATES PATENTS

| Number | Name | Date |
|---|---|---|
| 1,926,173 | Place | Sept. 12, 1933 |
| 2,036,084 | Roder | Mar. 31, 1936 |
| 2,052,703 | Farnham | Sept. 1, 1936 |
| 2,511,185 | Ware | June 13, 1950 |
| 2,525,566 | Terlecki | Oct. 10, 1950 |
| 2,581,159 | Achenbach | Jan. 1, 1952 |

FOREIGN PATENTS

| Number | Country | Date |
|---|---|---|
| 465,593 | France | May 3, 1937 |
| 853,988 | France | Apr. 2, 1940 |
| 524,499 | Great Britain | Aug. 8, 1940 |